(12) United States Patent
Ito

(10) Patent No.: US 8,424,970 B2
(45) Date of Patent: Apr. 23, 2013

(54) VEHICLE SEAT RECLINING DEVICE

(75) Inventor: Sadao Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 582 days.

(21) Appl. No.: 12/665,251

(22) PCT Filed: Sep. 25, 2008

(86) PCT No.: PCT/JP2008/067274
§ 371 (c)(1),
(2), (4) Date: Dec. 17, 2009

(87) PCT Pub. No.: WO2009/041480
PCT Pub. Date: Apr. 2, 2009

(65) Prior Publication Data
US 2010/0201174 A1 Aug. 12, 2010

(30) Foreign Application Priority Data

Sep. 27, 2007 (JP) ................................. 2007-252735

(51) Int. Cl.
*B60N 2/225* (2006.01)
*B60N 2/22* (2006.01)
(52) U.S. Cl.
USPC ........................................................ 297/362
(58) Field of Classification Search .................. 297/362, 297/362.11, 361.1
See application file for complete search history.

(56) References Cited

U.S. PATENT DOCUMENTS

| 5,308,294 | A | 5/1994 | Wittig et al. |
| 6,712,430 | B2 * | 3/2004 | Ito et al. ........................ 297/362 |
| 6,918,635 | B2 | 7/2005 | Finner et al. |

(Continued)

FOREIGN PATENT DOCUMENTS

| JP | 2006-334284 A | 12/2006 |
| JP | 2007-136211 A | 6/2007 |
| JP | 2007-521894 A | 8/2007 |

OTHER PUBLICATIONS

0International Search Report prepared by the Japanese Patent Office in it's capacity as the International Searching Authority for International Application No. PCT/JP2008/067274 mailed Jan. 13, 2009.
Informal comments submitted on Mar. 11, 2009 in International Patent Application No. PCT/JP2008/067274.

(Continued)

*Primary Examiner* — David Dunn
*Assistant Examiner* — Tania Abraham
(74) *Attorney, Agent, or Firm* — Buchanan Ingersoll & Rooney

(57) ABSTRACT

A vehicle seat reclining device comprises an internal gear formed on a gear plate secured to a lower arm, an external gear formed on an upper arm to be meshed with the internal gear and being fewer by at least one tooth than the internal gear, wedge members frictionally engageable with, and disengageable therefrom, the gear plate or the upper arm, a spring arranged between the wedge members and urging the wedge members in a direction for friction engagement with either the gear plate or the upper arm, a drive shaft for pushing and rotating either one of the wedge members in a direction to release the friction engagement, and a ring member arranged between either one of the gear plate and the upper arm and the wedge members for rotating together with the wedge members relative to the other of the gear plate and the upper arm during rotation of the drive shaft.

8 Claims, 11 Drawing Sheets

U.S. PATENT DOCUMENTS

| | | | |
|---|---|---|---|
| 7,086,699 B1* | 8/2006 | Addison et al. | 297/374 |
| 7,188,903 B2* | 3/2007 | Finner et al. | 297/362 |
| 7,354,108 B2* | 4/2008 | Matsumoto et al. | 297/362 |
| 2006/0290187 A1 | 12/2006 | Scholz et al. | |
| 2007/0108824 A1 | 5/2007 | Lange | |
| 2007/0138853 A1* | 6/2007 | Ito et al. | 297/362 |
| 2008/0061616 A1* | 3/2008 | Wahls et al. | 297/362 |

OTHER PUBLICATIONS

Official Action dated May 17, 2011, issued by the Chinese Patent Office in corresponding Chinese Patent Application No. 200880021543.4, and English language translation of the Official Action.

* cited by examiner

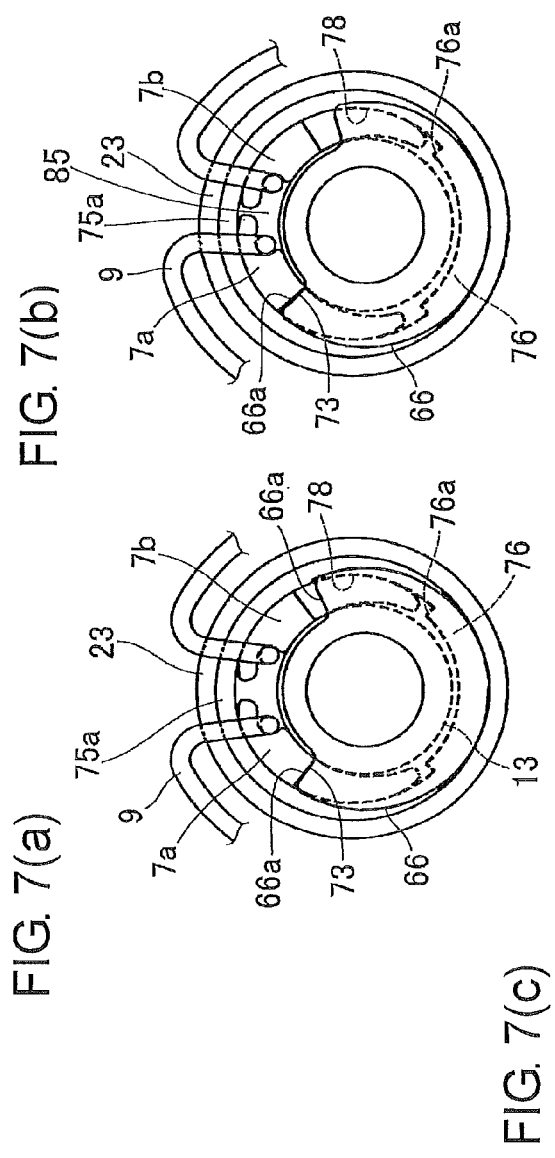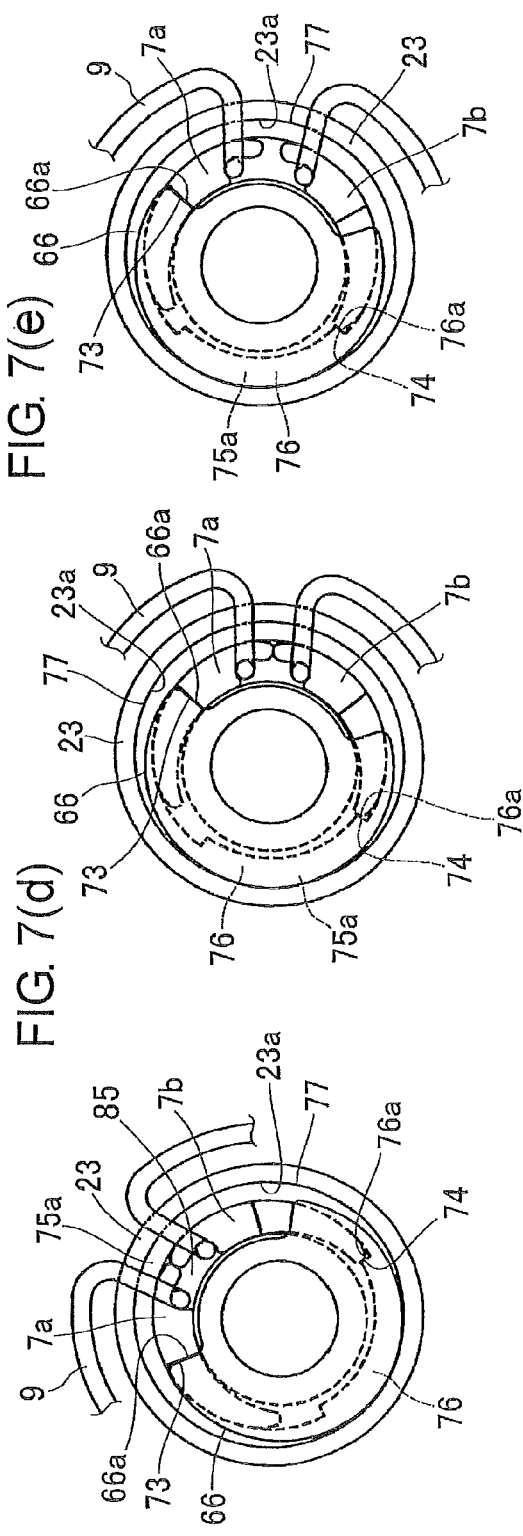

VEHICLE SEAT RECLINING DEVICE

TECHNOLOGICAL FIELD

The present invention relates to a vehicle seat reclining device for adjusting the angle of a seatback of a vehicle seat.

BACKGROUND ART

Heretofore, as vehicle seat reclining devices, there has been known one which, as shown in Patent Document 1, is provided with a lower arm (20) attached on the seat cushion side and securing an internal gear (32) thereto, an upper arm (10) attached on the seatback side and securing thereto an external gear (31) which is fewer in number of teeth than the internal gear (32), a pair of wedge members (35, 36) frictionally engageable with, and frictionally disengageable from, the lower arm (20) or the upper arm (10), a spring (37) arranged between the pair of wedge members (35, 36) and urging one of the wedge members (35, 36) at all times in a direction for friction engagement, and a drive shaft (33) for moving one of the wedge members (35, 36) in a direction to release the friction engagement against the resilient force of the spring (37) to rotate the wedge members (35, 36) relative to the lower arm (20) or the upper arm (10) through the spring (37). When the drive shaft (33) is rotated, one of the wedge members (35 for example) is pushed against the resilient force of the spring, and the other wedge member (36 for example) is also pushed through the spring. Then, the wedge members (35, 36) are both rotated relative to the lower arm (20) or the upper arm (10) to successively move the meshing position of the external gear (31) on the upper arm (10) relative to the internal gear (32) on the lower arm (20). As a result, the upper arm (10) is turned relative to the lower arm (20) in dependence on the difference in number of teeth between the external gear (31) and the internal gear (32), whereby the angle of the upper arm (10) relative to the lower arm (20) is adjusted.

Here, when the drive shaft (33) is rotated, the rotational torque of the drive shaft (33) is transmitted in the order of the driving side wedge member (35 for example), the spring (37) and the driven side wedge member (36 for example). When pushed by the spring (37), the driven side wedge member (36 for example) is rotated by being sandwiched between an internal surface of a bushing (34) secured to the internal gear (32) and an external surface of a cylindrical portion (31f) of the external gear (31). Thus, it may occur that the frictional resistance which the wedge members suffer from the internal surface of the busing (34) or the external surface of the cylindrical portion (31f) abruptly changes due to the gear accuracy or an external force. In this case, a momentary movement (skip) takes place on the wedge member (36 for example) when the same is released from the frictional resistance, so that the angle adjustment of the seatback is liable to be prevented from being carried out smoothly. To avoid this, in the Patent Document 1, it is proposed to suppress the occurrence of the skip of the wedge member on the driven side by bringing an elastic member (40) made of rubber into contact with the wedge member (36 for example) on the driven side to reduce the moving speed of the wedge member (36 for example) on the driven side.

Patent Document 1: JP2006-334284 A1 (refer to Claim 1 and paragraphs [0026] to [0048])

DISCLOSURE OF THE INVENTION

Problem to be Solved by the Invention

However, it is insufficient for the elastic member made of rubber to suppress the skip of the wedge member. Thus, it is conceivable to enhance the rubber hardness of the elastic member. In this case, however, the elastic member would become hard to flex and unable to adapt itself for a large rotational movement of the wedge member.

Further, the elastic member made of rubber is not suitable for actual use because anxieties arise in insufficiency of durability, rubber deterioration due to grease or oil, thermal influence by welding at the time of assembling.

The present invention has been made taking the foregoing circumstances into consideration, and a problem to be solved is to provide a vehicle seat reclining device capable of making it possible to adjust the angle of a seatback smoothly.

Measures for Solving the Problem

In order to solve the aforementioned problem, the invention in a first aspect comprises a lower arm adapted to be held on a side of a seat cushion of a vehicle seat, an upper arm adapted to be held on a side of a seatback of the vehicle seat, an internal gear formed on a first arm comprising either one of the lower arm and the upper arm, an external gear formed on a second arm comprising the other of the lower arm and the upper arm to be meshed with the internal gear and being fewer in number of teeth by at least one tooth than the internal gear, first and second wedge members frictionally engageable with the first arm and frictionally disengageable therefrom, a spring arranged between the first wedge member and the second wedge member and urging the first and second wedge members at all times in a direction for friction engagement with the first arm, a drive shaft provided with a drive portion for moving either one of the first wedge member and the second wedge member against the resilient force of the spring in a direction to release the friction engagement and for rotating the first and second wedge members through the spring about the rotational axis of the first arm, and a ring member arranged between the second arm and the first and second wedge members to be relatively rotatable for rotating together with the first and second wedge members relative to the second arm when brought into contact with the other of the first and second wedge members upon rotation of the drive portion. When, upon rotation of the drive shaft, the first and second wedge members are rotated relative to the first arm to make the ring member revolve around the rotational axis of the first arm, the second arm is eccentrically moved relative to the first arm to turn the upper arm relative to the lower arm in dependence on the difference in number of teeth between the internal gear and the external gear.

The invention in a second aspect comprises a lower arm adapted to be held on a side of a seat cushion of a vehicle seat, an upper arm adapted to be held on a side of a seatback of the vehicle seat, an internal gear formed on a first arm comprising either one of the lower arm and the upper arm, an external gear formed on a second arm comprising the other of the lower arm and the upper arm to be meshed with the internal gear and being fewer in number of teeth by at least one tooth than the internal gear, first and second wedge members frictionally engageable with the second arm and frictionally disengageable therefrom, a spring arranged between the first wedge member and the second wedge member and urging the first and second wedge members at all times in a direction for friction engagement with the second arm, a drive shaft provided with a drive portion for moving either one of the first wedge member and the second wedge member against the resilient force of the spring in a direction to release the friction engagement and for rotating the first and second wedge members through the spring about the rotational axis of the first arm, and a ring member arranged between the first arm and the first and second wedge members to be relatively rotatable for rotating together with the first and second wedge members relative to the first arm when brought into contact with the other of the first and second wedge members upon rotation of the drive portion. When, upon rotation of the drive shaft, the first and second wedge members are rotated together with the ring member relative to the first arm, the second arm is eccentrically moved relative to the first arm to turn the upper arm relative to the lower arm in dependence on the difference in number of teeth between the internal gear and the external gear.

The feature of the invention in a third aspect resides in that the ring member has a cylindrical sliding contact surface which is along a cylindrical surface formed on the second arm, and also has a wide-width portion radially protruding in a sector form on the side opposite to the cylindrical sliding contact surface and that a side end surface of the wide-width portion is a contact surface which is contactable with the other of the first and second wedge members.

The feature of the invention in a fourth aspect resides in that the ring member has a cylindrical sliding contact surface which is along a cylindrical surface formed on the first arm, and also has a wide-width portion radially protruding in a sector form on the side opposite to the cylindrical sliding contact surface and that a side end surface of the wide-width portion is a contact surface which is contactable with the other of the first and second wedge members.

The feature of the invention in a fifth aspect resides in that the ring member is arranged radially outside of the first wedge member and the second wedge member.

The feature of the invention in a sixth aspect resides in that the ring member is arranged radially inside of the first wedge member and the second wedge member.

The features of the inventions in seventh and eighth aspects reside in that the drive shaft has a cam portion which protrudes from the drive shaft in a radially expanding direction and which is contactable at opposite end surfaces thereof respectively with the first wedge member and the second wedge member and that a sum (A) of an angle which a clearance between one of the end surfaces of the cam portion and the first wedge member makes about the center of the drive shaft and an angle which a clearance between the other end surface of the cam portion and the second wedge member makes about the center of the drive shaft has a relation $A \leq B$ with respect to a sum (B) of an angle which a clearance between the first wedge member and the contact surface of the ring member makes about the center of the ring member and an angle which a clearance between the second wedge member and another contact surface of the ring member makes about the center of the ring member.

Effects of the Invention

In the invention in the first aspect, the ring member is relatively rotatably arranged between the second arm comprising the other of the lower arm and the upper arm and the first and second wedge members. Upon rotation of the drive portion, the ring member is brought into contact with the wedge member on the driven side of the first and second wedge members and is rotated relative to the second arm. During this time, the ring member provides the wedge member on the driven side with a load corresponding to the load of the ring member. Therefore, when the change of an external force or the change in the eccentricity (the change of the center-to-center distance between the external gear and the internal gear) due to the defect in gear accuracy occurs during rotation thereby to make the rotational speed of the wedge member on the driven side tend to increase abruptly, the ring member acts as a load to suppress the increase in the rotational speed of the wedge member on the driven side. Accordingly, it is possible to prevent the abrupt motion (skip) of the wedge member on the driven side from occurring. Therefore, it is possible to perform the angle adjustment of the seatback smoothly.

Further, the ring member takes a ring shape. Thus, even when the ring member, through rotation, takes any position in the circumferential direction, it is possible to impose an even load on the wedge member on the driven side. Accordingly, it is possible to effectively suppress the skip of the wedge member on the driven side.

In the invention in the second aspect, the ring member is relatively rotatably arranged between the first arm comprising one of the lower arm and the upper arm and the first and second wedge members. Upon rotation of the drive portion, the ring member is brought into contact with the wedge member on the driven side of the first and second wedge members and is rotated together with the first and second wedge members relative to the first arm. During this time, the ring member applies a load corresponding to the load of the ring member to the wedge member on the driven side. Therefore, when the change of an external force or the change in the eccentricity due to the defect in gear accuracy occurs during rotation thereby to make the rotational speed of the wedge member on the driven side tend to increase abruptly, the ring member acts as a load to suppress the increase in the rotational speed of the wedge member on the driven side. Accordingly, it is possible to prevent the abrupt motion (skip) of the wedge member on the driven side from occurring. Therefore, it is possible to perform the angle adjustment of the seatback smoothly.

Further, even when the ring member, through rotation, takes any position in the circumferential direction, it is possible to impose an even load on the wedge member on the driven side. Accordingly, it is possible to effectively suppress the skip of the wedge member on the driven side.

In the invention in the third aspect, the ring member has the cylindrical sliding contact surface which is along the cylindrical surface formed on the second arm. Thus, even when the wedge members take any positions in the circumferential direction, the ring member can maintain the sliding resistance even against the press-fitted ring and hence, can impose on the wedge members an even load depending on the sliding resistance. Further, the side end surface of the sector-shape wide-width portion which protrudes radially of the ring member is a contact surface which is contactable with the other of the first and second wedge members. Thus, the side end surface of the wide-width portion surely contacts with the wedge member on the driven side and can effectively suppress the skip of the wedge member on the driven side. It is to be noted that "cylindrical surface formed on the second arm" may be a portion of the second arm itself or may be a portion of a member bodily secured to the second arm.

In the invention in the fourth aspect, the ring member has the cylindrical sliding contact surface which is along the cylindrical surface formed on the first arm. Thus, even when the wedge members take any positions in the circumferential direction, the ring member can maintain the sliding resistance even against the press-fitted ring and hence, can impose on the wedge members an even load depending on the sliding resistance. Further, the side end surface of the sector-shape wide-width portion which protrudes radially of the ring member is a contact surface which is contactable with the other of the first and second wedge members. Thus, the side end surface of the wide-width portion surely contacts with the wedge member on the driven side and can effectively suppress the skip of the wedge member on the driven side. It is to be noted that "cylindrical surface formed on the first arm" may be a portion of the first arm itself or may be a portion of a member bodily secured to the first arm.

In the invention in the fifth aspect, because of being arranged radially outside of the first wedge member and the second wedge member, the ring member is larger in radius than the wedge member on the driven side, and the rotational moment becomes larger by a moment corresponding to that. Therefore, it is possible to decelerate the wedge member on the driven side further effectively.

In the invention in the sixth aspect, because of being arranged radially inside of the first wedge member and the second wedge member, the ring member is smaller in radius than the wedge member on the driven side, and the rotational moment becomes smaller by a moment corresponding to that. Therefore, although the deceleration effect on the wedge members diminishes in comparison with that in the case where the ring member is arranged radially outside, the force to push the ring member becomes enough to be weaker by a force corresponding to that. Accordingly, it is possible to save the rotational torque which is required for the drive portion to rotate the wedge members.

In the inventions in the seventh and eighth aspects, the sum (A) of the angle which the clearance between one of the end surfaces of the cam portion and the first wedge member makes about the center of the drive shaft and the angle which the clearance between the other end surface of the cam portion and the second wedge member makes about the center of the drive shaft has the relation A≦B with respect to the sum (B) of the angle which the clearance between the first wedge member and the contact surface of the ring member makes about the center of the ring member and the angle which the clearance between the second wedge member and another contact surface of the ring member makes about the center of the ring member. Thus, even when the pair of wedge members are held to open through the maximum angle allowed by the cam portion, the wedge members come close, with little clearances, to the side end surfaces of the ring member or only come to positions where they are just in contacts with the side end surfaces. Therefore, it is possible to reliably bring the wedge members into friction engagements with the lower arm or the upper arm.

BRIEF DESCRIPTION OF THE DRAWINGS

FIGS. 7(a)-7(e) are illustrations for explaining the operations of wedge members and a ring member when a drive shaft in FIG. 5 is rotated clockwise.

DESCRIPTION OF SYMBOLS

1: gear plate, 2: upper arm, 3: vehicle seat, 5: drive device, 6: drive shaft, 7a, 7b: wedge members, 8: linking shaft, 9: spring, 10: vehicle seat reclining device, 11: lower arm, 12: internal gear, 13: bearing portion, 17, 23: press-fitted ring, 20: seatback, 22: external gear, 24: pivot shaft hole, 25: bearing portion, 30: seat cushion, 66: cam portion, 71: protruding portion, 75a, 75b: ring member, 76: wide-width portion, 76a: end surfaces, 77: external surface, 78: internal surface, 79: narrow-width portion, 85: clearance.

PREFERRED EMBODIMENTS FOR PRACTICING THE INVENTION

Figure 1:
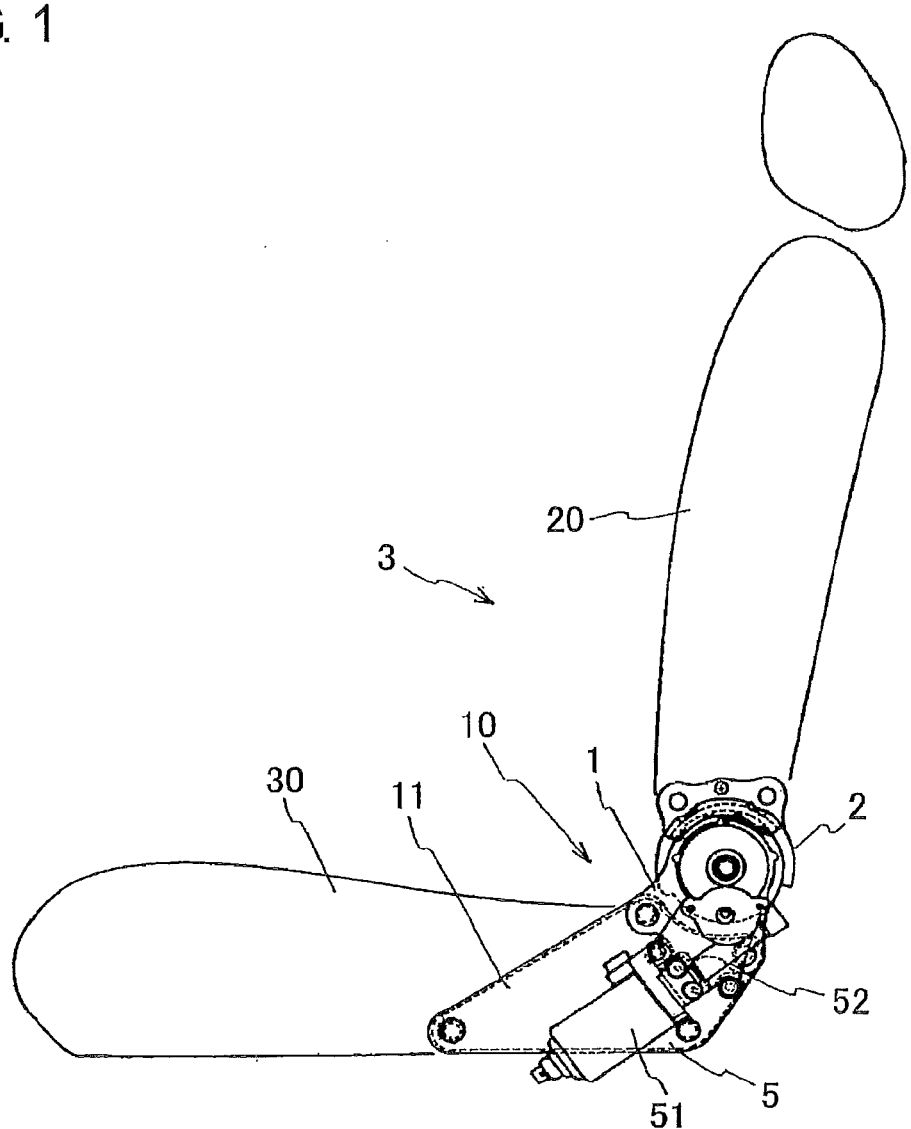
FIG. 1 is a side view of a vehicle seat to which a vehicle seat reclining device in a first embodiment according to the present invention is attached.

Hereafter, a first embodiment of the present invention will be described. As shown in FIG. 1, a vehicle seat reclining device 10 is for adjusting the tilt angle of a seatback 20 relative to a seat cushion 30. In the present embodiment, the vehicle seat reclining devices 10 which take roughly symmetrical constructions are attached respectively to the left and right of a vehicle seat 3, and the vehicle seat reclining devices 10 on both sides are connected by a linking shaft 8 referred to later. The vehicle seat reclining device 10 on one side has attached thereto a drive device 5 with a motor 51 and is operated together with the vehicle seat reclining device 10 on the other side which does not have a drive device. The following description of the vehicle seat reclining devices 10 will be made mainly regarding the construction and operation of that on the side having the drive device 5.

Figure 2:
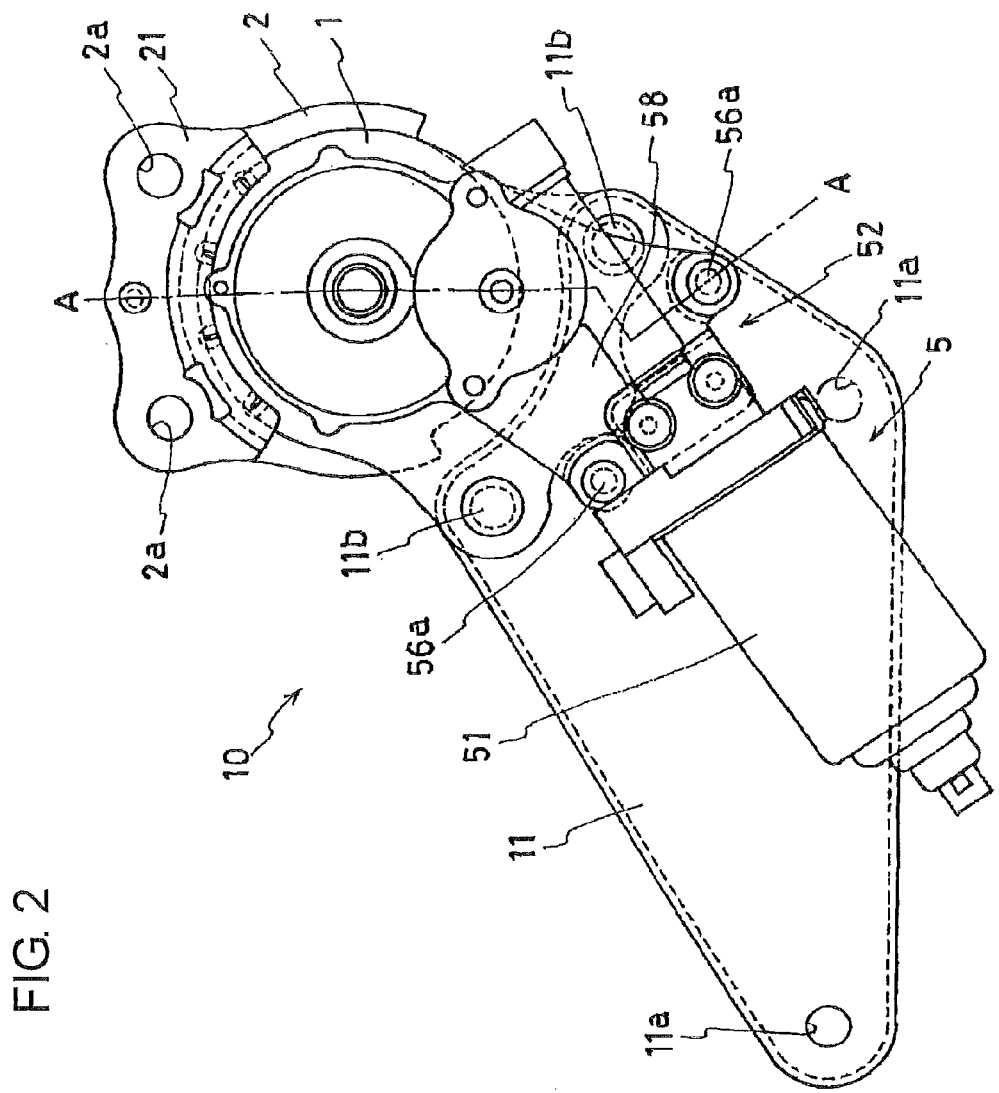
FIG. 2 is a side view of the vehicle seat reclining device in the first embodiment.
Figure 3:
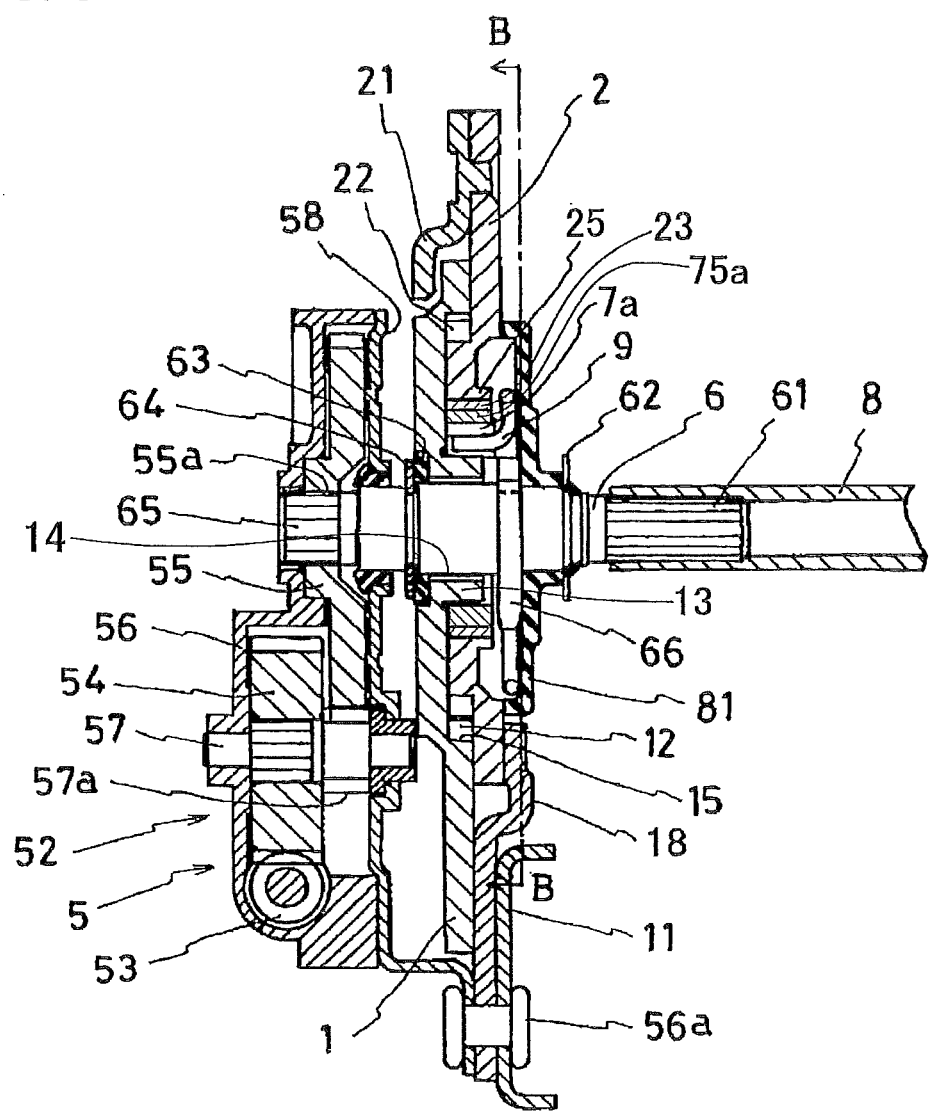
FIG. 3 is a sectional view taken along the A-A in FIG. 2.
Figure 4:
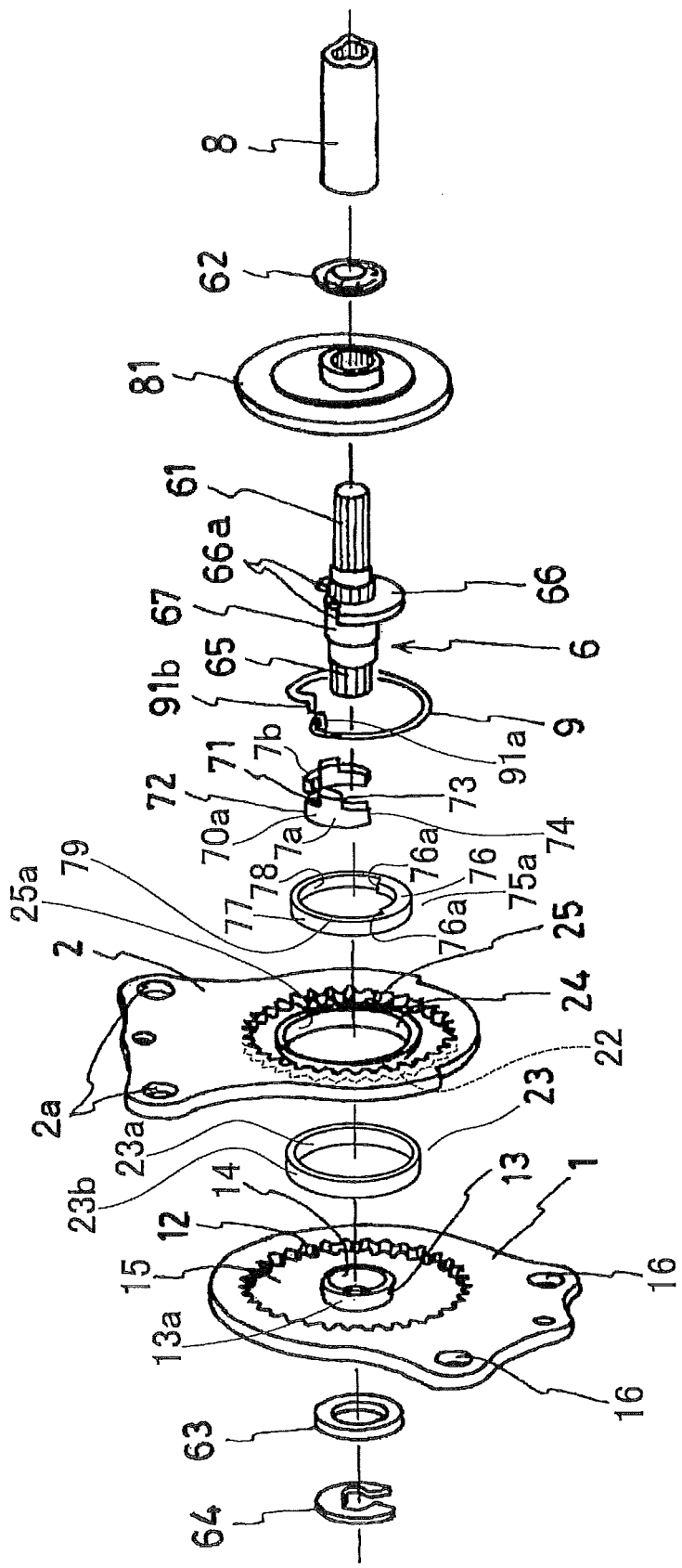
FIG. 4 is a perspective view in a disassembled state of the vehicle seat reclining device in the first embodiment.

As shown in FIGS. 1 and 2, the seat cushion 30 is secured to a lower arm 11 by the use of attaching holes 11a. A gear plate 1 (first arm, fixed member) is fixedly attached to the lower arm 11 by means of pins 11b at two places. As shown in FIGS. 3 and 4, a space 15 is formed by half-blanking press working at about the center portion of the gear plate 1 to be depressed from a generally flat portion therearound and to have an internal gear 12 at the circumference thereof. At the center portion of the space 15, therein is formed a bearing portion 13 having a shaft hole 14 and cylindrically rising in an open-side direction of the depression of the space 15.

As shown in FIGS. 1 and 2, the seatback 20 is secured to an upper arm 2 (second arm, movable member) by the use of attaching holes 2a. As shown in FIG. 4, at about the center of the upper arm 2, an external gear 22 is formed by half-blanking press working to protrude in the form of a circle from a generally flat portion therearound and to be on the circumference of the circle. Some teeth (the upper side in FIG. 5) of the external gear 22 on the upper arm 2 are meshing with some teeth of the internal gear 12 on the gear plate 1. The number of the teeth of the external gear 22 on the upper gear 2 is set to be slightly fewer than the number of the teeth of the internal gear 12 on the gear plate 1. Further, the upper arm 2 has a pivot shaft hole 24 at the center portion of the protruding portion, and a bearing portion 25 is formed around the pivot shaft hole 24 to rise toward the side opposite to the protruding direction of the protruding portion. A press-fitted ring 23 whose external surface 23b has the same shape as the internal surface of the bearing portion 25 is press-fitted in the pivot shaft hole 24.

Figure 5:
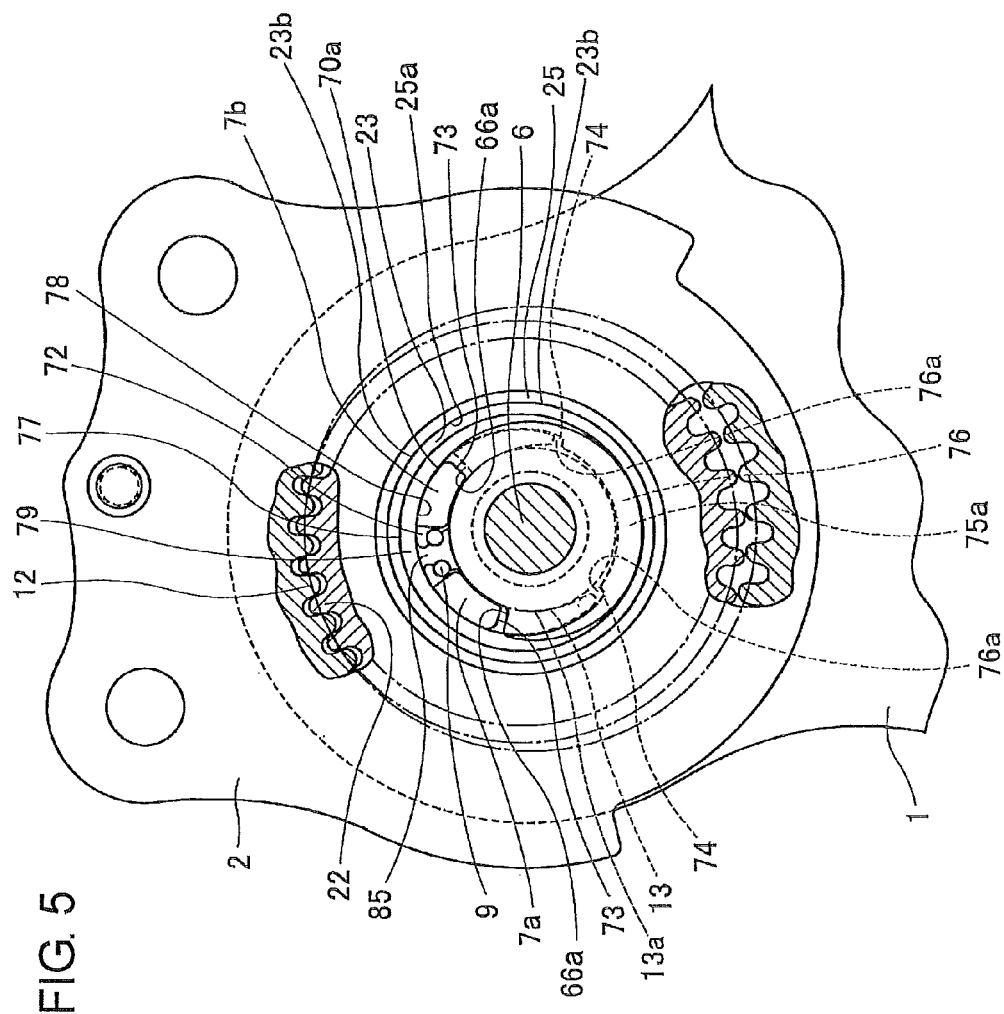
FIG. 5 is a sectional view taken along the line B-B in FIG. 3.

Further, as shown in FIG. 5, the internal gear 12 and the external gear 22 are held to be meshed by a pair of wedge members 7a, 7b. The pair of wedge members 7a, 7b are arranged in a radial space formed between an external surface 13a of the bearing portion 13, which is formed on the gear plate 1 concentrically of the internal gear 12, and an internal surface 23a of the press-fitted ring 23, which is fitted in the upper arm 2 eccentrically relative to the external surface 13a but concentrically of the external gear 22. The pair of wedge members 7a, 7b take wedge shapes that mutually closer portions of the two members become thicker in thickness, and are provided with thick-side end portions 72 at respective one ends close to each other of the two members and with thin-side end portions 74 at respective other ends. The wedge members 7a, 7b take arc shapes having their internal surfaces 70b contactable with the external surface 13a of the bearing portion 13 of the gear plate 1 and their external surfaces 70a slidably contactable with the internal surface 23a of the press-fitted ring 23. Further, the external surfaces 70a of the wedge members 7a, 7b are friction surfaces having the same shape as the internal surface 78 of a narrow-width portion 79 of a ring member 75a. The internal surfaces 70b of the wedge members 7a, 7b are each formed as a wedge surface of the shape which forms a little clearance with the bearing portion 13 at a portion adjacent to the thin-side end portion 74 and which makes the clearance with the bearing portion 13 become narrower as it goes toward the side of the thick-side end portion 72, and ultimately become contactable. Then, in the example of the state shown in FIG. 5, the wedge members 7a, 7b are arranged to cover the approximately half circumference of the external surface 13a of the bearing portion 13, and further, a clearance 85 is provided between the wedge members 7a, 7b. A spring 9 acting to widen the clearance 85 is arranged in the clearance 85. As shown in FIG. 4, the spring 9 is engaged at its one end 91a with the thick-side end portion 72 of one of the wedge members 7a and at the other end 91b with the thick-side end portion 72 of the other wedge member 7b.

As shown in FIGS. 4 and 5, the metal-made ring member 75a is arranged at the outer side of the wedge members 7a, 7b. The ring member 75a has the narrow-width portion 79 and a sector-shape wide-width portion 76 protruding toward the radial inside beyond the narrow-width portion 79. The external surface 77 of the ring member 75a is a cylindrical sliding surface which is along and concentric with the cylindrical internal surface 23a of the press-fitted ring 23. The narrow-width portion 79 is circumferentially uniform in thickness, and the internal surface 78 of the narrow-width portion 79 is concentric with the external surface 77. Further, the internal surface 78 of the narrow-width portion 79 has a shape which is along the external surfaces 70a of the wedge members 7a, 7b. Opposite end surfaces 76a of the wide-width portion 76 are contact surfaces with which the thin-side end portions 74 of the wedge members 7a, 7b are contactable.

As shown in FIGS. 3 and 4, a drive shaft 6 passes through the shaft hole 14 of the gear plate 1 to be rotatable. A cam portion 66 of a sector shape whose flat-shape disc is partly cut out to open in a radial direction is formed at an approximately mid portion in the lengthwise direction of the drive shaft 6. On the other hand, protruding portions 71 are formed on end surface portions of the aforementioned two wedge members 7a, 7b to protrude axially beyond the end surfaces of the bearing portion 25 of the upper arm 2 and the press-fitted ring 23. Then, when the drive shaft 6 is rotated in one direction, an end surface 66a of the cutout portion of the cam portion 66 is brought into an end surface 73 of the protruding portion 71 of either of the wedge members 7a, 7b and moves the either wedge member to make the clearance 85 between the two wedge members 7a, 7b narrower. Further, when the drive shaft 6 is rotated in the opposite direction, the cam portion 66 moves the other of the wedge members 7a, 7b to make the clearance narrow in the same manner. As described above, because the protruding portions 71 are configured to be formed on the end surfaces of the wedge members 7a, 7b and to be brought into contact with the end surfaces 66a of the cam portion 66 which is formed by cutting out the flat-shape disc on the drive shaft 6, it is possible to manufacture the drive shaft 6 with the cam portion 66 easily by plastic working method. Further, the generally disk-like flat portion of the cam portion 66 has a diameter which covers the end surfaces on the end surface portions of the wedge members 7a, 7b except for the protruding portions 71, and also acts to prevent the wedge portions 7a, 7b from coming off predetermined positions even when an excess load acts from the seatback with the result that a large load is imposed on the wedge members 7a, 7b.

As shown in FIGS. 2 and 3, the drive shaft 6 is formed at opposite end portions thereof with serration portions 61, 65 each of which has a plurality of tooth grooves extending in the axial direction. The drive device 5 is secured on the lower arm 11 by means of pins 56a. The drive device 5 has a reduction device 52 which is composed of a device housing 56, the motor 51 as driving source, a worm gear 53, a worm wheel 54, a pinion gear 57a on a pinion shaft 57 and a gear 55, and transmits the rotation of the motor 51 to the gear 55 at the final stage. The gear 55 has at its center a serration 55a engaged with the serration portion 65 on the drive shaft 6. Although not shown here, the motor 51 is constructed to be rotatable in a positive-going direction and a negative-going direction by a switch manipulated by the passenger.

Although the functional components have been described as discussed above, in order to bring the reclining device 10 into an assembled state, as shown in FIGS. 3 and 4, a retaining ring 64 is fitted in a circumferential groove on the drive shaft 6 together with a washer 63 on the gear plate 1 side of the drive shaft 6, while a cover 81 having the function to hold the spring 9 is fastened by means a retaining ring 62 on the upper plate 2 side of the drive shaft 6. Further, in order to prevent the meshing between the teeth of the gear plate 1 and the upper arm 2 from coming off in the axial direction when an excess load is imposed on the vehicle seat reclining device 10, a retaining plate 21 and a retaining plate 18 are attached to the upper arm 2 and the gear plate 1 to sandwich therebetween the gear plate 1 and the upper arm 2 which are others of the mating parts, respectively.

One end of the linking shaft 8 is fitted on the serration portion 61 of the drive shaft 6. The other end of the linking shaft 8 is engaged with the serration on the side opposite to the drive shaft 6 and transmits the driving force of the drive device 5 to the other vehicle seat reclining device 10 provided on the opposite side of the seat.

Figure 6:
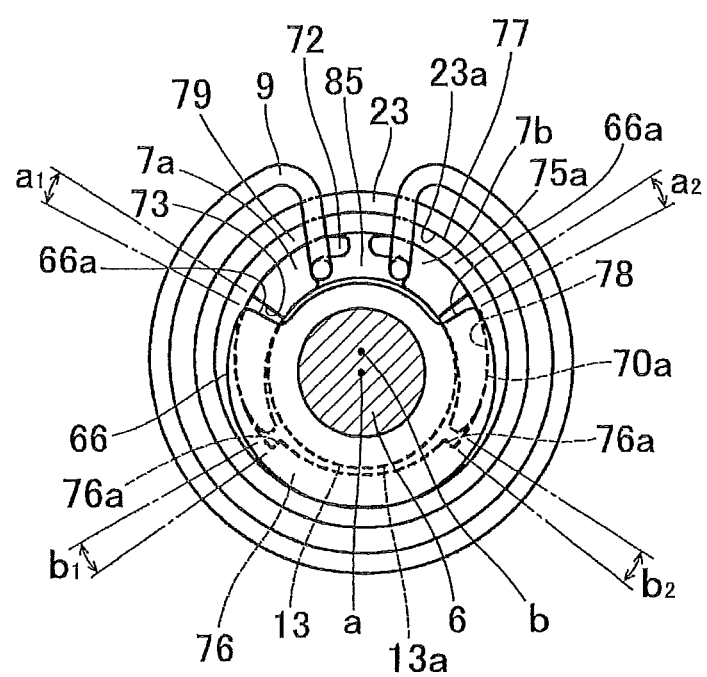
FIG. 6 is an enlarged sectional view showing primary components of the vehicle seat reclining device in the first embodiment.

Next, description will be made regarding the angle adjusting operation of the vehicle seat reclining devices. First of all, as shown in FIGS. 5 and 6, when the drive shaft 6 is not being rotated, the wedge members 7a, 7b are urged by the spring 9 in a direction to go away from each other. Thus, when the wedge members 7a, 7b are made to go away from each other by the spring 9, the internal surfaces 70b of the wedge members 7a, 7b act as wedge surfaces by being strongly pushed on the bearing portion 13. Then, friction forces act between the wedge members 7a, 7b and the bearing portion 13 to restrict the rotations of the wedge members 7a, 7b. As a result of being pushed by the bearing portion 13 in radial outward directions, the external surfaces 70a are strongly pushed on the internal surface 78 of the ring member 75a. Thus, the external surfaces 70a acts as friction surfaces and are brought into friction engagements with the narrow-width portion 79 of the ring member 75a. In this way, the rotations of the wedge members 7a, 7b and the ring member 75a relative to the gear plate 1 are restricted. With the rotations restricted, the meshing between the external gear 22 on the upper arm 2 and the internal gear 12 on the gear plate 1 is held at a predetermined position.

Here, as shown in FIGS. 5 and 6, the clearance between one end surface 66a of the cam portion 66 of the drive shaft 6 and the end surface 73 of the protruding portion 71 of one wedge member 7a makes an angle a1 about the center a of the drive shaft 6. The clearance between the other end surface 66a of the cam portion 66 and the end surface 73 of the protruding portion 71 of the other wedge member 7b makes an angle a2 about the center a. Further, the clearance between the thin-side end portion 74 of one wedge member 7a and one end surface 76a of the wide-width portion 76 of the ring member 75a makes an angle b1 about the center b of the ring member 75a. The clearance between the thin-side end portion 74 of the other wedge member 7b and the other end surface 76a of the wide-width portion 76 makes an angle b2 about the center b. The sum A of the angles a1 and a2 and the sum B of the angles b1 and b2 have a relation A≦B therebetween. That is, there applies a relation (a1+a2)≦(b1+b2). Therefore, even in the state that the two wedge members 7a, 7b are opened through the maximum opening angle allowed by the end surfaces 66a of the cam portion 66, the thin-side end portions 74 of the wedge members 7a, 7b have little clearances relative to the end surfaces 76a of the wide-width portion 76 of the ring member 75a without contacting therewith or are only at respective positions just to contact with the end surfaces 76a. Therefore, it is possible to bring the wedge members 7a, 7b into strong friction engagements with the bearing portion 13 of the gear plate 1. Accordingly, the meshing position between the internal gear 12 and the external gear 22 can be maintained reliably.

Then, as shown in FIGS. 2 and 3, when the manipulation of the switch (not shown) causes the motor 51 to rotate in one direction, the rotational torque is transmitted to the drive shaft 6 through the reduction device. As shown in FIG. 7(a), upon rotation of the drive shaft 6 in one direction, the end surface 66a of the cam portion 66 comes into contact with the end surface 73 of the protruding portion 71 which is on the wedge member 7a on the driving side of the wedge members 7a, 7b. Herein, the wedge member on the driving side means a wedge member which is on the side to be directly moved by the cam portion 66, whereas the wedge member on the driven side means a wedge member which is on the side to be indirectly moved by the wedge member on the driving side through the spring 9. Therefore, either of the wedge members 7a, 7b selectively serves as a wedge member on the driving side or as a wedge member on the driven side in dependence on the rotational direction of the drive shaft 6.

Then, as shown in FIG. 7(b), the wedge member 7a on the driving side is made to be rotated about the rotational axis of the drive shaft 6 against the force of the spring 9 thereby to narrow down the clearance 85 relative to the wedge member 7b on the driven side. Thus, the friction engagements by the wedge members 7a, 7b are released, and the meshing position between the internal gear 12 and the external gear 22 becomes movable. Further rotation of the drive shaft 6 causes the clearance 85 between the thick-side end portions 72 of the both wedge members 7a, 7b to decrease further. Otherwise, under certain circumstances, both of the thick-side end portions 72 come into contact with each other in dependence upon the balance between the load imposed on the seatback and the urging force of the spring 9. In this state, the wedge member 7a, 7b are rotated about the rotational axis of the drive shaft 6 in the same direction as the drive shaft 6 is rotated. Further, because the thickness of the wedge members 7a, 7b differs in the circumferential direction, the center of the ring member 75a is at a position which is eccentric from the rotational axis of the drive shaft 6. Thus, the rotations of the wedge members 7a, 7b cause the ring member 75a to revolve around the rotational axis of the drive shaft 6. Then, the internal gear 12 on the gear plate 1 is concentric with the bearing portion 13 and has its center a on the rotational axis of the drive shaft 6. Further, because the wedge members 7a, 7b each having the thickness which differs in the circumferential direction exist in the space relative to the press-fitted ring 23 on the upper arm 2, the center a of the internal gear 12 on the gear plate 1 is eccentric from the center b of the external gear 22 on the upper arm 2 (FIG. 6). Thus, upon revolution of the ring member 75a, the external gear on the upper arm 2 is eccentrically moved relative to the internal gear 12 of the gear plate 1. As a result, the meshing position between the external gear 22 and the internal gear 12 is moved.

Shortly, as shown in FIG. 7(c), the thin-side end portion 74 of the wedge member 7b on the driven side comes to contact with one end surface 76a of the ring member 75a. As the wedge members 7a, 7b are rotated further, as shown in FIG. 7(d), the wedge member 7b on the driven side pushes the ring member 75a while being held in contact with the end surface 76a. The ring member 75a, with its outer surface 77 being slidden on the internal surface 23a of the press-fitted ring 23 secured to the upper arm, begins to rotate together with the wedge members 7a, 7b relative to the bearing portion 13 of the gear plate 1. Because at the stage shown in FIG. 7(b), the ring member 75a has already begun to revolve around the rotational axis of the drive shaft 6 with the rotations of the wedge members 7a, 7b, the rotational motion is added for the first time at the stage shown in FIG. 7(d). As shown in FIG. 5, at this stage, the external gear 22 is eccentrically moved relative to the center of the internal gear 12, whereby the meshing position of the teeth moves successively. Then, each time the drive shaft 6 makes one turn, the upper arm 2 is turned relative to the gear plate 1 by an angle corresponding to the difference between the numbers of the teeth on the both members. As a result, the angle of the seatback 20 is adjusted relative to the seat cushion 30.

It is to be noted that where the motor 51 is rotated in the opposite direction by the manipulation of the switch, the drive shaft 6 is rotated in the opposite direction, and the master-slave relation between the wedge members 7a, 7b are reversed, so that the wedge member 7b becomes the driving side while the wedge member 7a becomes the driven side.

When the motor is stopped by the manipulation of the switch, the rotation of the drive shaft 6 stops. Then, the cam portion 66 of the drive shaft stops its rotation, as shown in FIG. 7(e). Thus, the rotation of the wedge member 7a on the driving side is stopped. The wedge member 7b on the driven side is further rotated by the urging force of the spring 9 to widen the space 85 relative to the wedge member 7a on the driving side. Subsequently, as shown in FIG. 6, the drive shaft 6 is reversely rotated slightly, whereby the end surface 66a of the cam portion 66 is separated from the end surface 73 of the protruding portion 71 of the wedge member 7a on the driving side. By the urging force of the spring 9, the wedge members 7a, 7b are moved in the direction to widen the space 85 and are stopped by the wedge effects of the external surfaces 70a. Consequently, the upper arm 2 is locked on the gear plate 1 at a set angle, with the meshing position held between the internal gear 12 and the external gear 22.

By the way, it may occur that the center-to-center distance between the external gear 22 and the internal gear 12 would change in dependence on the change in the external force during rotation or the defect in the gear accuracy whereby the load which the wedge member 7b on the driven side receives from the gear plate 1 or the like would decrease abruptly. In this case, the rotational speed of the wedge member 7b on the driven side tends to increase abruptly. However, the thin-side end portion 74 of the wedge member 7b on the driven side is pushing the ring member 75a through the contact with the end surface 76a of the wide-width portion 76 of the ring member 75a. Thus, the load of the ring member 75a itself and the sliding resistance of the same against the press-fitted ring 23 cause the wedge member 7b to receive a load from the press-fitted ring 23. Thus, the abrupt increase in the rotational speed of the wedge member 7b is suppressed. Accordingly, it is possible to prevent the abrupt movement (skip) of the wedge member 7b on the driven side from occurring. Therefore, it becomes possible to make the angle adjustment of the seatback smoothly.

Further, the ring member 75a takes the form of a ring. Thus, it is possible to impose an even load on the wedge member 7b on the driven side. Further, the external surface 77 of the ring member 75a and the internal surface 23a of the press-fitted ring 23 are in slidable contact over the whole circumference thereof, and the area for the slidable contact is large. Further, even if the ring member 75b takes any circumferential position through the rotation, it is possible to maintain the sliding resistance against the press-fitted ring 23 even. Therefore, the ring member 75a can slide and rotate smoothly and stably and can stably apply a force depending on the sliding resistance to the wedge member 7b of the driven side. Accordingly, it can be realized to effectively prevent the occurrence of skip.

Further, because of being arranged radially outside of the wedge members 7a, 7b, the ring member 75a is larger in radius than the wedge member 7b on the driven side, and the rotational moment becomes larger by an amount corresponding to that. Further, because of sliding on the press-fitted ring 23 at its external surface, the ring member 75a has a large sliding area in comparison with the case where it slides at its internal surface 78. Therefore, it is possible to apply a large force corresponding to the sliding resistance to the wedge member 7b on the driven side and hence, to decelerate the wedge member 7b effectively.

Figure 8:
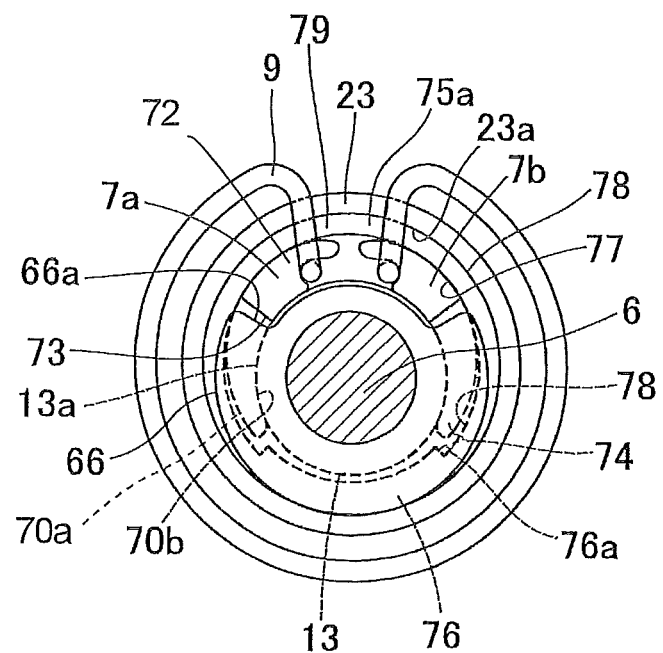
FIG. 8 is an enlarged sectional view of primary components of a vehicle seat reclining device in a second embodiment.

Further, the internal surface 78 of the ring member 75a takes a shape which is along the external surfaces 70a of the wedge members 7a, 7b. Thus, even if the wedge members 7a, 7b take any positions in the circumferential direction, the sliding resistances acting on the both members are held even, and it is possible to stably apply a force corresponding to the sliding resistance to the wedge members 7a, 7b. Further, the ring member 75a has the end surface 76a which axially protrudes to be contactable with the thin-side end portion 74 of the wedge member 7b on the driven side. Thus, the ring member 75a can effectively suppress the skip of the wedge member 7b on the driven side through the contact with the wedge member 7b on the driven side As shown in FIG. 8, in a vehicle seat reclining device according to a second embodiment, the internal surfaces 70b of the wedge members 7a, 7b take a shape which is along the external surface 13a of the bearing portion 13 of the gear plate, and the external surfaces 70a have a clearance relative to the ring member 75a on the sides of the thin-side end portions 74 and also have wedge surfaces on the sides of the thick-side end portions 72. Thus, when the space between the wedge members 7a, 7b is widened by the spring 9, the external surfaces 70a and the internal surfaces 70b of the wedge members 7a, 7b in the second embodiment respectively act as wedge surfaces and friction surfaces though the internal surfaces 70b and the external surfaces 70a of the wedge members in the first embodiment respectively act as wedge surfaces and friction surfaces (FIG. 6). Thus, when the drive shaft 6 is not being rotated, the wedge members 7a, 7b are strongly pushed by the internal surface 78 of the ring member 75a to be frictionally engaged with the external surface 13a of the bearing portion 13. Thus, the meshing position between the internal gear 12 formed on the gear plate 1 and the external gear 22 formed on the upper arm 2 is maintained.

Figure 9:
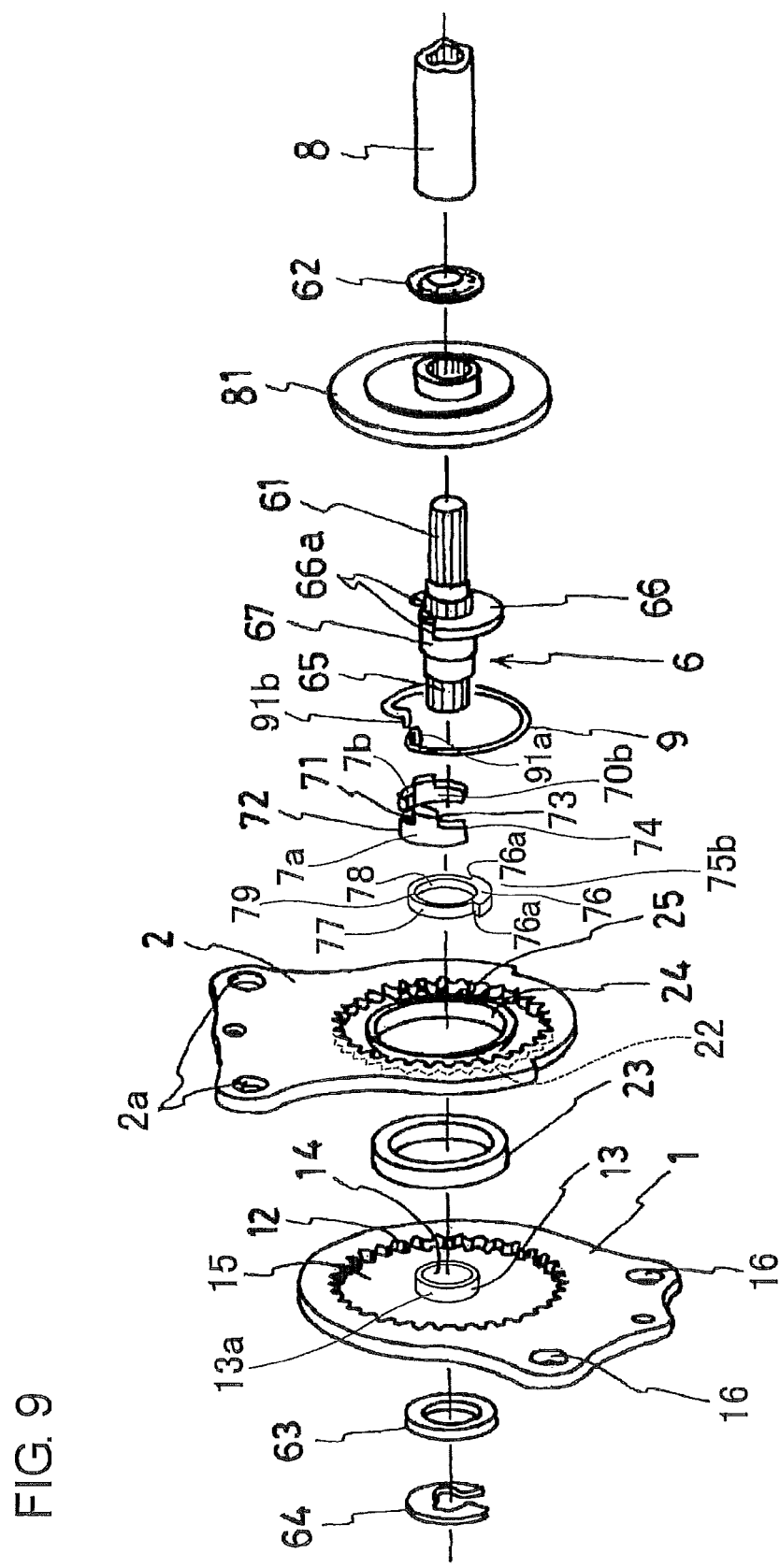
FIG. 9 is a perspective view in a disassembled state of a vehicle seat reclining device in a third embodiment.
Figure 10:
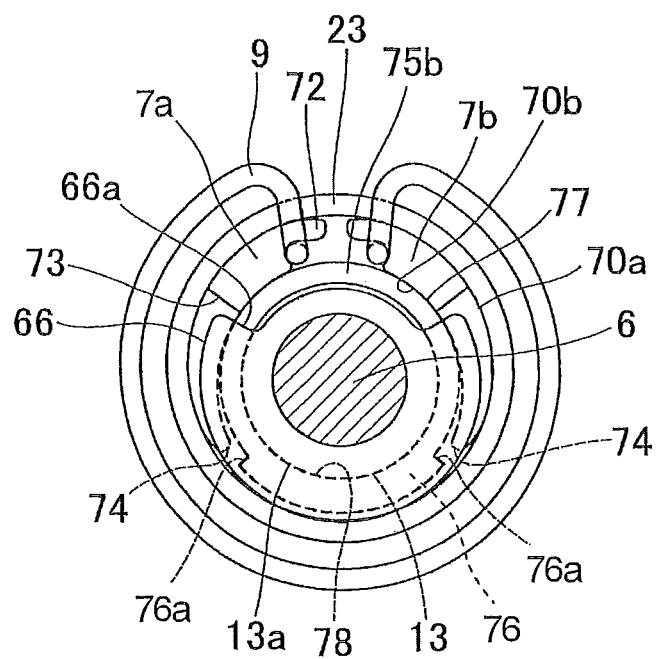
FIG. 10 is an enlarged sectional view showing primary components of the vehicle seat reclining device in the third embodiment.

As shown in FIGS. 9 and 10, a vehicle seat reclining device according to a third embodiment differs from the first embodiment in that a ring member 75b is arranged inside of the wedge members 7a, 7b. A wide-width portion 76 with end surfaces 76a which are contactable with the thin-side end portions 74 of the wedge members 7a, 7b protrudes radially outward from the external surface 77 of the ring member 75b. An external surface 77 of a narrow-width portion 79 of the ring member 75b is held in sliding contact with the internal surfaces 70b of the wedge members 7a, 7b. The entirety of an internal surface 78 of the ring member 75b is held in sliding contact with the external surface 13a of the bearing portion 13 of the gear plate 1. The external surfaces 70a of the wedge members 7a, 7b take the same shape as the internal surface 23a of the press-fitted ring 23. Further, the internal surfaces 70b of the wedge members 7a, 7b are formed as wedge surfaces each of which forms a little clearance relative to the bearing portion 13 at around the thin-side end portion 74, makes the clearance relative to the bearing portion 13 become narrower as it goes towards the side of the thick-side end portion 72 and ultimately comes to be contactable with the bearing portion 13. Therefore, in the third embodiment, like the first embodiment, the external surfaces 70a and the internal surfaces 70b of the wedge members 7a, 7b act respectively as friction surfaces and wedge surfaces.

In the third embodiment, when the rotation of the drive shaft 6 causes the wedge members 7a, 7b to be rotated, the ring member 75b is pushed by the wedge member 7b on the driven side at the end surface 76a of the wide-width portion 76 and is rotated together with the wedge members 7a, 7b relative to the gear plate 1 with the internal surface 78 being slidden on the external surface 13a of the bearing portion 13 of the gear plate 1. Thus, it is possible to eccentrically move the upper arm 2 relative to the gear plate 1 and to rotate the upper arm 2 relative to the lower arm 11 in dependence on the difference in number of teeth between the internal gear 12 and the external gear 22. Further, even when the change in an external force during the rotation or the defect in the gear accuracy makes the rotational speed tend to change abruptly, an increase in the rotational speed of the wedge member 7b on the driven side is suppressed by the load of the ring member 75b itself and the sliding resistance against the bearing portion 13. Accordingly, like the first embodiment, it is possible to prevent the occurrence of an abrupt motion (skip) of the wedge member 7b on the driven side.

Further, because of being arranged radially inside of the wedge members 7a, 7b, the ring member 75b is smaller in radius than the wedge member 7b on the driven side, and the rotational moment therefor is made to be smaller by an amount corresponding to that. Therefore, although the force to decelerate the wedge member 7b becomes smaller than that in the case where it is arranged radially outside, the force to rotate the ring member 75b becomes enough to be smaller by a force corresponding to that. Accordingly, it becomes possible to save the rotational torque of the motor required to rotate the wedge members 7a, 7b.

Figure 11:
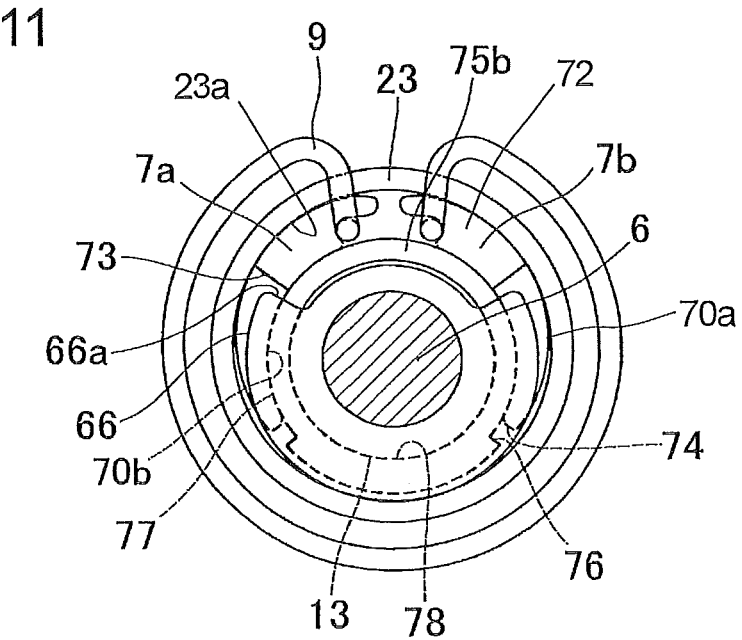
FIG. 11 is an enlarged sectional view showing primary components of the vehicle seat reclining device in a fourth embodiment.

As shown in FIG. 11, in a vehicle seat reclining device according to a fourth embodiment, the internal surfaces 70b of the wedge members 7a, 7b take a shape which is along the external surface 77 of the ring member 75b, and the external surfaces 70a have clearances relative to the press-fitted ring 23 on the sides of the thin-side end portions 74 and also have wedge surfaces on the sides of the thick-side end portions 72. Thus, when the space between the wedge members 7a, 7b is widened by the spring 9, the external surfaces 70a and the internal surfaces 70b of the wedge members 7a, 7b in the fourth embodiment respectively act as wedge surfaces and friction surfaces though the internal surfaces 70b and the external surfaces 70a of the wedge members in the third embodiment respectively act as wedge surfaces and friction surfaces. Thus, when the drive shaft 6 is not being rotated, the wedge members 7a, 7b are strongly pushed by the internal surface 23a of the press-fitted ring 23 to be frictionally engaged with the external surface 77 of the ring member 75b. Thus, the meshing position between the internal gear 12 formed on the gear plate 1 and the external gear 22 formed on the upper arm 2 is maintained.

Figure 12:
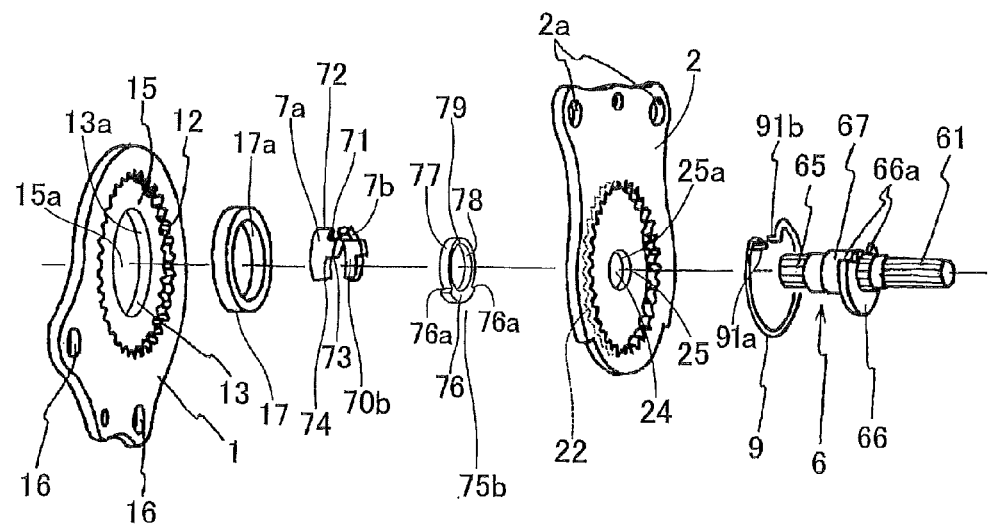
FIG. 12 is a perspective view in a disassembled state of a gear plate, wedge members, a ring member, an upper arm and a drive shaft in a fifth embodiment.

As shown in FIG. 12, a vehicle seat reclining device according to a fifth embodiment differs from the first embodiment in that an internal surface 17a of a press-fitted ring 17 press-fitted in the gear plate 1 which surface is to rotate the ring member 75b therealong opens larger than a bearing portion 25 of the upper arm 2 does and also in that the ring member 75b has a wide-width portion 76 protruding radially outwards. Other constructions of the present embodiment are same as those in the first embodiment.

According to the fifth embodiment, the ring member 75b is arranged between the wedge members 7a, 7b and the upper arm 2. Thus, even when the gear accuracy or the action of an external force makes the wedge member 7b on the driven side tend to abruptly increase in rotational speed, such increase in the rotational speed is suppressed by the load of the ring member 75b and the sliding resistance against the bearing portion 25. Accordingly, it is possible to suppress the skips of the wedge members.

Figure 13:
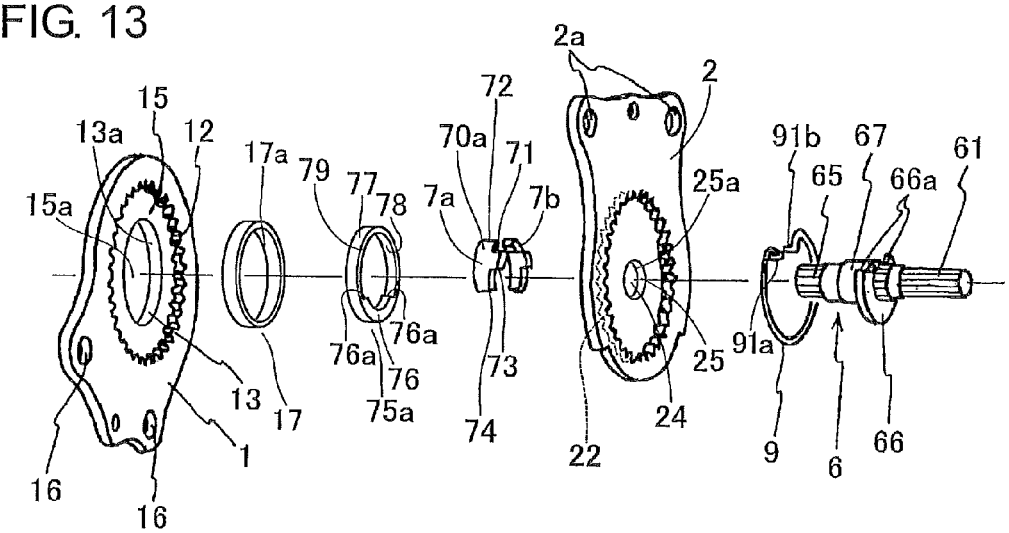
FIG. 13 is a perspective view in a disassembled state of a gear plate, wedge members, a ring member, an upper arm and a drive shaft in a sixth embodiment.

As shown in FIG. 13, a vehicle seat reclining device according to a sixth embodiment differs from the third embodiment in that the surface 17a of a press-fitted ring 17 press-fitted in the gear plate 1 which surface is to rotate the ring member 75a therealong opens larger than the bearing portion 25 of the upper arm 2 does and also in that the ring member 75a has the wide-width portion 76 protruding radially inward. The constructions of the gear plate 1 and the upper arm 2 are same as those in the fifth embodiment.

According to the sixth embodiment, the ring member 75a is arranged between the wedge members 7a, 7b and the gear plate 1. Thus, even when the gear accuracy or the action of an external force makes the wedge member 7b on the driven side tend to abruptly increase in rotational speed, such increase in the rotational speed is suppressed by the load of the ring member 75a and the sliding resistance against the bearing portion 25. Accordingly, it is possible to suppress the skips of the wedge members.

In the first through sixth embodiments, the upper arm with the external teeth is eccentrically moved relative to the gear plate with the internal teeth. However, the upper arm may be provided with internal teeth, may be held on the seatback and may be eccentrically moved relative to the gear plate having external teeth and held on the seat cushion.

Although the embodiments of the present invention have been described as aforementioned, the present invention is not limited to the foregoing embodiments. It is needless to say that various modifications are possible without departing from the gist of the present invention described in the scopes of the patent claims. The present invention is characterized by having the lower arm adapted to be held on the side of the seat cushion of the vehicle seat, the upper arm adapted to be held on the side of the seatback of the vehicle seat, the internal gear formed on a first arm comprising either one of the lower arm and the upper arm, the external gear formed on a second arm comprising the other of the lower arm and the upper arm to be meshed with the internal gear and being fewer by at least one tooth than the internal gear, first and second wedge members frictionally engageable with, and frictionally disengageable from, either one of the first arm and the second arm, a spring arranged between the first wedge member and the second wedge member and urging the first and second wedge members at all times in a direction for friction engagement with either one of the first arm and the second arm, a drive shaft provided with a drive portion for moving the either one of the first wedge member and the second wedge member against the resilient force of the spring in a direction to release the friction engagement and for rotating the first and second wedge members through the spring about the rotational axis of the first arm, and a ring member arranged between the other of the first arm and the second arm and the first and second wedge members to be relatively rotatable for rotating together with the first and second wedge members relative to the other of the first arm and the second arm when brought into contact with the other of the first and second wedge members upon rotation of the drive portion.

INDUSTRIAL APPLICABILITY

A vehicle seat reclining device according to the present invention is for adjusting the angle of a seatback of a vehicle seat and particularly, is suitable to the case in which the angle adjustment of the seatback is required to be smooth.

The invention claimed is:

1. A vehicle seat reclining device comprising:
   a lower arm adapted to be held on a side of a seat cushion of a vehicle seat;
   an upper arm adapted to be held on a side of a seatback of the vehicle seat;
   an internal gear formed on a first arm comprising either one of the lower arm and the upper arm;
   an external gear formed on a second arm comprising the other of the lower arm and the upper arm to be meshed with the internal gear and being fewer in number of teeth by at least one tooth than the internal gear;
   first and second wedge members frictionally engageable with the first arm and frictionally disengageable therefrom;
   a spring arranged between the first wedge member and the second wedge member and urging the first and second wedge members at all times in a direction for friction engagement with the first arm;

a drive shaft provided with a drive portion for moving either one of the first wedge member and the second wedge member against the resilient force of the spring in a direction to release the friction engagement and for rotating the first and second wedge members through the spring about the rotational axis of the first arm; and a ring member arranged between the second arm and the first and second wedge members to be relatively rotatable for rotating together with the first and second wedge members relative to the second arm and for being rotatably driven by the movements of the first and second wedge members when brought into contact with the other of the first and second wedge members upon rotation of the drive portion;

wherein when, upon rotation of the drive shaft, the first and second wedge members are rotated relative to the first arm to make the ring member revolve around the rotational axis of the first arm, the second arm is eccentrically moved relative to the first arm to turn the upper arm relative to the lower arm in dependence on the difference in number of teeth between the internal gear and the external gear.

2. The vehicle seat device according to claim 1, wherein:
the ring member has a cylindrical sliding contact surface which is along a cylindrical surface formed on the second arm and also has a wide-width portion radially protruding in a sector form on the side opposite to the cylindrical sliding contact surface; and
a side end surface of the wide-width portion is a contact surface which is contactable with the other of the first and second wedge members.

3. The vehicle seat device according to claim 2, wherein:
the drive shaft has a cam portion which protrudes from the drive shaft in a radially expanding direction and which is contactable at opposite end surfaces thereof respectively with the first wedge member and the second wedge member; and
a sum (A) of an angle which a clearance between one of the end surfaces of the cam portion and the first wedge member makes about the center of the drive shaft and an angle which a clearance between the other end surface of the cam portion and the second wedge member makes about the center of the drive shaft has a relation $A \leqq B$ with respect to a sum (B) of an angle which a clearance between the first wedge member and the contact surface of the ring member makes about the center of the ring member and an angle which a clearance between the second wedge member and another contact surface of the ring member makes about the center of the ring member.

4. The vehicle seat device according to claim 1, wherein the ring member is arranged radially outside of the first wedge member and the second wedge member.

5. A vehicle seat reclining device comprising:
a lower arm adapted to be held on a side of a seat cushion of a vehicle seat;
an upper arm adapted to be held on a side of a seatback of the vehicle seat;
an internal gear formed on a first arm comprising either one of the lower arm and the upper arm;
an external gear formed on a second arm comprising the other of the lower arm and the upper arm to be meshed with the internal gear and being fewer in number of teeth by at least one tooth than the internal gear;

first and second wedge members frictionally engageable with the second arm and frictionally disengageable therefrom;

a spring arranged between the first wedge member and the second wedge member and urging the first and second wedge members at all times in a direction for friction engagement with the second arm;

a drive shaft provided with a drive portion for moving either one of the first wedge member and the second wedge member against the resilient force of the spring in a direction to release the friction engagement and for rotating the first and second wedge members through the spring about the rotational axis of the first arm; and a ring member arranged between the first arm and the first and second wedge members to be relatively rotatable for rotating together with the first and second wedge members relative to the first arm and for being rotatably driven by the movements of the first and second wedge members when brought into contact with the other of the first and second wedge members upon rotation of the drive portion;

wherein when, upon rotation of the drive shaft, the first and second wedge members are rotated together with the ring member relative to the first arm, the second arm is eccentrically moved relative to the first arm to turn the upper arm relative to the lower arm in dependence on the difference in number of teeth between the internal gear and the external gear.

6. The vehicle seat device according to claim 5, wherein:
the ring member has a cylindrical sliding contact surface which is along a cylindrical surface formed on the first arm and also has a wide-width portion radially protruding in a sector form on the side opposite to the cylindrical sliding contact surface; and
a side end surface of the wide-width portion is a contact surface which is contactable with the other of the first and second wedge members.

7. The vehicle seat device according to claim 5, wherein the ring member is arranged radially inside of the first wedge member and the second wedge member.

8. The vehicle seat device according to claim 7, wherein:
the drive shaft has a cam portion which protrudes from the drive shaft in a radially expanding direction and which is contactable at opposite end surfaces thereof respectively with the first wedge member and the second wedge member; and
a sum (A) of an angle which a clearance between one of the end surfaces of the cam portion and the first wedge member makes about the center of the drive shaft and an angle which a clearance between the other end surface of the cam portion and the second wedge member makes about the center of the drive shaft has a relation $A \leqq B$ with respect to a sum (B) of an angle which a clearance between the first wedge member and the contact surface of the ring member makes about the center of the ring member and an angle which a clearance between the second wedge member and another contact surface of the ring member makes about the center of the ring member.

* * * * *